Sept. 6, 1966 B. F. GRIFFIN, JR 3,270,849

PNEUMATIC KEYBOARD INPUT DEVICES

Filed Oct. 18, 1961 2 Sheets-Sheet 1

INVENTOR
BENJAMIN F. GRIFFIN, JR.
BY Griffin and Stokes
ATTORNEYS

PNEUMATIC KEYBOARD INPUT DEVICES

Filed Oct. 18, 1961

United States Patent Office 3,270,849

Patented Sept. 6, 1966

3,270,849
PNEUMATIC KEYBOARD INPUT DEVICES

Benjamin F. Griffin, Jr., Fairfax County, Va., assignor to Sperry Rand Corporation, New York, N.Y., a corporation of Delaware

Filed Oct. 18, 1961, Ser. No. 145,947
17 Claims. (Cl. 197—15)

This invention relates to pure fluid bistable switches and more particularly to manual or mechanical controls for pure fluid bistable switches. The present invention provides manually or mechanically controllable devices suitable for use in keyboards and control panels of the type associated with typewriters, adding machines and digital calculators.

Pure fluid amplifiers comprise a recent addition to the field of digital controls. These devices have no moving parts and, generally speaking, comprise a plurality of interconnected channels arranged such that a high energy fluid power stream is selectively switched from one output channel to another under the control of a plurality of control streams each of which has less energy than the power stream.

Fluid amplifiers may be made to exhibit bistable characteristics. That is, by proper design of the fluid channels the power stream may be made to continue to flow through a given output channel even after the control stream which caused that flow has terminated. Even though fluid amplifiers may be made bistable they may be unsuitable for use as storage devices because "backloading" caused by blockage of an output channel may cause the power stream to switch from the blocked output channel to an unblocked output channel. Heretofore, this has been considered an undesirable characteristic and special designs of the output channel have been devised to prevent switching of the power stream from the blocked output channel.

An object of this invention is to utilize the switching characteristic resulting from backloading to provide simple and economical means for entering information into a fluid system.

An object of this invention is to provide a keyboard comprising a plurality of bistable fluid switches and key operated means for selectively switching said switches by selectively blocking their output channels.

An object of this invention is to provide bistable pure fluid switches having control chambers and output channels designed such that blocking of an output channel causes the power stream to flow through a second output chanel, and means for blocking at least one of the output channels.

Another object of this invention is to provide keyboard operated means for switching a pure fluid switch from one stable state to another, said means requiring no fluid control stream.

Another object of this invention is to provide a keyboard mechanism comprising a key, a bistable fluid switch having a power stream input channel and first and second output channels, said first output channel terminating at an opening in said key, and said switch having an internal configuration of fluid channels whereby blockage of said opening causes the power stream to switch from the first output channel to the second output channel.

Still another object of this invention is to provide a bistable fluid amplifier, means for blocking one output channel of the amplifier to cause the power stream to switch to the second output channel, said fluid amplifier having a control signal input channel to which fluid pulses may be applied to switch the amplifier back to the initial state.

A further feature of this invention is the provision of a rotatable control element associated with a bistable pure fluid amplifier. In a first position, the control element blocks the first output channel of the amplifier. In a second position the control element blocks the second output channel and in a third position, it blocks neither of the output channels. The amplifier is provided with two control channels whereby it may be selectively set or reset by fluid control pulses if the control element is in its third position. The amplifier may be manually set by rotating the control element from the third position to the first position and back to the third position. The amplifier may be manually reset by rotating the control element from the third position to the second position and back to the first position. Thus, simple means are provided for either manually or automatically controlling the amplifier with the manual control having an overriding control if desired.

Other objects of the invention and its mode of operation will become apparent upon consideration of the following description and the accompanying drawings in which.

Pure fluid amplifiers may be made of plastic, metallic, ceramic or another material. Generally speaking they may comprise three flat sheets of material. One sheet is etched, stamped, molded or otherwise formed to have the desired configuration of channels. This sheet is then placed between two solid sheets of material and the sheets held tightly together with mechanical fasteners or adhesives. The resulting structure is a substantially solid body having a plurality of channels therein to which air or another gas or water or another liquid may be applied. The above methods are given by way of example only and fluid amplifiers constructed in other ways are suitable for use in the present invention.

Figure 1:
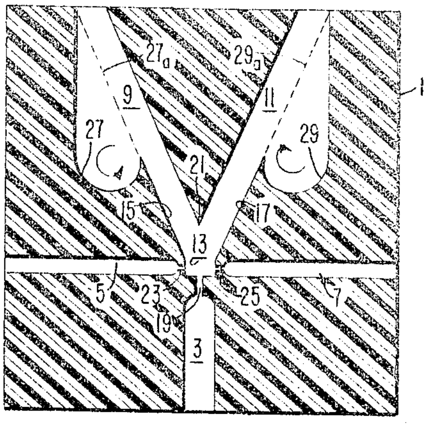
FIGURE 1 is a sectional view of a typical bistable fluid amplifier.

FIGURE 1 is a sectional view showing the channel configuration of a typical fluid amplifier. The amplifier comprises a substantially solid body 1 having a power stream input channel 3, first and second control signal channels 5 and 7, and first and second output signal channels 9 and 11. The output signal channels intersect to form a chamber 13 with the walls 15 and 17 being offset from the edges of orifice 19 through which the power stream enters the chamber. A dividing blade 21 lies along the axis of power stream orifice 19.

The offset of walls 15 and 17 causes the amplifier to exhibit a bistable characteristic when a substantially constant stream of fluid is applied to channel 3 and control signals are selectively applied to channels 5 and 7.

Assume that walls 15 and 17 are offset from the edges of orifice 19 with wall 17 being offset a greater distance than wall 15. When a substantially constant stream of fluid is applied to channel 3 it emerges from orifice 19 as a high velocity jet stream, passes through chamber 13, and flows out through output channel 9. The reason for this is as follows. The high velocity jet stream issuing from orifice 19 creates regions of low pressure adjacent its path of flow by withdrawing molecules of fluid from these regions. If wall 15 is closer than wall 17 to the orifice 19 the power jet stream withdraws more molecules of fluid from the region adjacent wall 15 than it does from the region adjacent wall 17. This results in a lower pressure between the wall 15 and the jet stream than between wall 17 and the jet stream. This difference in pressure acts on the jet stream tending to bend it toward wall 15. As the jet stream moves closer to wall 15 it becomes more efficient in withdrawing the fluid molecules from this region thus creating an even lower pressure therein. Eventually the jet stream is bent until the low pressure boundary layer causes the jet stream to "lock-on" to the wall 15 and flow out through channel 9.

The power jet continues to flow through channel 9 until a control signal is applied to channel 5. The application of a fluid signal to channel 5 disrupts the boundary layer adjacent wall 15 and the fluid jet issuing from orifice 23 deflects the power stream towards the wall 17. When the jet stream has been deflected until it is closer to wall 17 than wall 15 it becomes more efficient in withdrawing molecules of fluid from the region adjacent wall 17. This causes further deflection of the power jet until it locks on to the wall 17 and flows out through channel 11. When the control signal applied to channel 5 is terminated the boundary layer causes the power stream to remain locked on to the wall 17 so that the power stream continues to flow through channel 11.

The power stream may be returned to channel 9 and again locked on to wall 15 by application of a fluid signal to channel 7. This signal causes a jet stream to issue from orifice 25 to thereby disrupt the boundary layer adjacent wall 17 and deflect the power stream toward wall 15.

Heretofore it has been customary to provide output channels 9 and 11 with acute offsets such that the channels have a wall configuration as indicated by numerals 27 and 29. These offsets create vortices in which fluid flows as indicated by the arrows thus enhancing the bistable characteristics of the fluid amplifier by aiding in maintaining the reduced pressure in the boundary layer regions adjacent walls 15 and 17. In other instances the bistable characteristic has been enhanced by spacing the dividing element 21 from the orifice 19 by a distance greater than twelve times the width of the orifice.

Heretofore it has been considered desirable to provide such enhancement in order to prevent fluid amplifiers from switching as a result of backloading.

If the walls 15 and 17 have no sharp curved portions 27 and 29 but instead have only slight curvature or are straight as indicated by the phantom lines 27*a* and 29*a* and the dividing element 21 is spaced from orifice 19 less than twelve times the width of the orifice, the amplifier is still bistable but becomes sensitive to load conditions due to lack of boundary layer enhancement. In the following description and claims the term bistable fluid amplifier refers to an amplifier of this type as opposed to bistable fluid amplifiers with enhancement of boundary layer control.

Bistable fluid amplifiers without enhancement respond to fluid control signals applied over channels 5 and 7 in the same manner as bistable fluid amplifiers with enhancement. The primary difference occurs when the amplifier output channel through which the power stream is flowing is blocked or severely restricted. As explained above, if the output channels or divider are shaped to enhance boundary layer control, the power stream continues to flow into the output channel to which it was last deflected by a fluid control signal even if the output channel is blocked. On the other hand, if there is no enhancement of the boundary layer control, the power stream may be switched from one output channel to the other merely by blocking or restricting the output channel through which the power stream is flowing. For example, if the power stream issuing from orifice 19 is locked on to wall 15 and is flowing through channel 9, it may be switched so that it locks on to wall 17 and flows through channel 11 merely by blocking or restricting the channel 9. The power stream may be switched back to channel 9 by restricting or blocking channel 11.

The control signal channels 5 and 7 may be used in an amplifier without enhancement of the bistable characteristic to switch the power stream as described above. However, since the bistable amplifier without enhancement may be switched from either stable state to the other without the use of fluid control signals, some embodiments of the invention hereinafter described do not utilize fluid control signal channels 5 and 7. Such devices are more aptly termed pure fluid bistable switches since there is no amplification in the usual sense.

Figure 3:
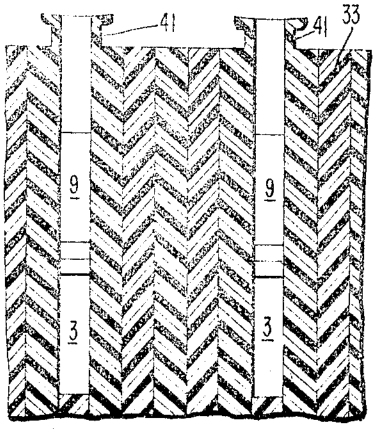
FIGURE 3 is a sectional view taken along the line A—A of FIGURE 2.
Figure 2:
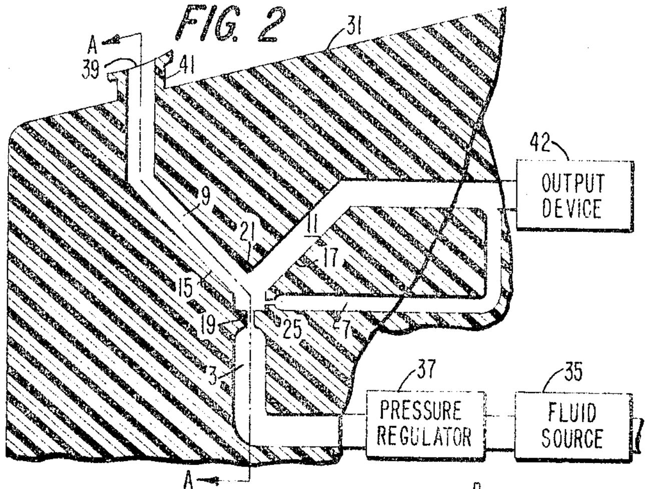
FIGURE 2 is a sectional view of a keyboard constructed in accordance with the present invention.

FIGURE 2 is a sectional view of a keyboard input device suitable for use with typewriters, key punches, fluid computers, and like devices. The keyboard 31 comprises a plurality of laminated sheets 33 as shown in FIGURE 3. Certain of the laminated sheets have formed therein a configuration of channels forming a bistable fluid amplifier without enhancement. Each bistable amplifier comprises a power stream input channel 3, first and second output signal channels 9 and 11, and a control signal input channel 7. A fluid stream is applied to the channel 3 by the fluid source 35 which may be a compressor or pump. Preferably this fluid stream is regulated by a conventional pressure regulator 37 so that a substantially constant stream of fluid is supplied to the channel 3. The dividing element 21 is positioned along the center line of the orifice 19 and the wall 17 is offset from the orifice slightly more than the wall 15 so that when fluid is initially applied to the channel 3, it emerges from the orifice 19, locks on to the wall 15, and flows out through the channel 9. The amplifier is considered to be in the reset state when fluid flows through channel 9.

Output channel 9 terminates at an orifice 39 in the surface of a key 41. The key may be stationary and constructed as an integral part of the keyboard 31 or alternatively may comprise a separate element which is spring biased in order to give the operator the familiar resilient feel of keyboards such as those shown in the prior art. Output channel 11 is connected to the output device 42 which may, for instance, be a type or punch actuating means or one stage of a storage device in a pure fluid data handling system. Output channel 11 also connects with the control signal input channel 7 to provide a signal to reset the amplifier each time it is set.

The keyboard input device of FIGURE 2 operates as follows. When fluid is applied to the power stream input channel 3, it initially flows through channel 9 and exhausts into the atmosphere through orifice 39. When the keyboard operator places a finger over the orifice 39 thus blocking the flow of fluid through the channel 9, the amplifier switches so that the power stream locks onto the wall 17 and flows out through the channel 11. This latter condition is designated the set state. Fluid flow in the channel 11 causes an increase in pressure therein which may be utilized to operate the output device 42. A portion of the fluid flowing in channel 11 is directed back into channel 7 and emerges from orifice 25 as a high velocity jet stream which deflects the power stream from orifice 19 into channel 9 so that it locks on to wall 15 as soon as the operator's finger is removed from the orifice 39. This operation is repeated each time the orifice 39 is closed.

It is not necessary that the control signal channel 7 be connected with output channel 11. Instead, the output device may be arranged to produce a fluid pulse after it has been actuated. This pulse may then pass through channel 7 and orifice 25 to reset the amplifier.

Figure 5:
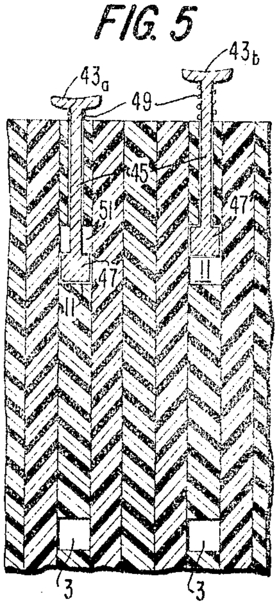
FIGURE 5 is a sectional view taken along the line B—B of FIGURE 4.
Figure 4:
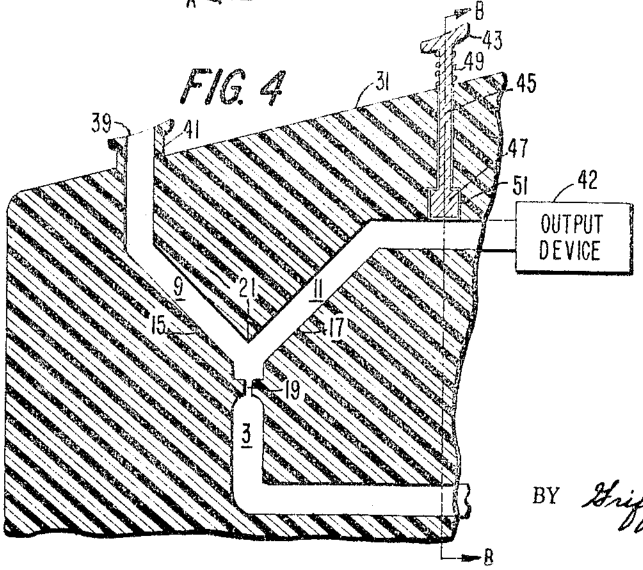
FIGURE 4 is a sectional view of a keyboard showing a second embodiment of the invention.

FIGURES 4 and 5 illustrate a keyboard input device having one set of keys 41 for setting a plurality of bistable fluid switches and a second set of keys 43 for resetting the switches. Each bistable switch includes a power stream input channel 3 and first and second output signal channels 9 and 11. Output channel 9 terminates at orifice 39 in the key 41 and output channel 11 is connected to apply signals to the output device 42. The configuration of channels 9 and 11 and the position of the dividing element 21 is such as to provide no enhancement of the boundary layer control although enhancement may be provided in channel 11 as subsequently described. The walls 15 and 17 are offset from the orifice 19 to provide boundary layer control with the wall 15 being placed closer to the orifice 19 so that when fluid is initially applied to the power stream input channel 3, it flows through channel 9 and out through orifice 39.

Each bistable switch is provided with a key 43 connected by means of a key stem 45 to a body 47. A compression spring 49 normally holds the key 43 in its uppermost position with the body 47 resting within a chamber 51. The arrangement is such that when the key 43 is depressed the body 47 moves downward into channel 11 to block the channel or substantially restrict the flow of fluid therethrough. FIGURE 5 is a side view of FIGURE 4 showing two of the reset keys 43. Key **43*b* is shown in its normal or reset position and key 43*a* is shown in its operated position whereby the body 47 blocks the associated channel 11**.

The keyboard device of FIGURE 4 operates as follows. Fluid is continuously applied to the power stream input channel 3 and upon initial application flows through the channel 9 and exhausts into the atmosphere through orifice 39. When the operator blocks orifice 39 by placing a finger on the key 41, the bistable switch switches from its reset state to its set state and the power stream flows through channel 11 to actuate the output device 42. The power stream remains locked on to the wall 17 and flows through the channel 11 until the key 43 is depressed thus moving the body 47 downward to block the channel 11. When channel 11 is blocked by the body 47 the bistable switch switches from its set state to its reset state and the power stream again flows through channel 9 and exits through orifice 39. The switch maintains this reset condition even after the key 43 is released and returns to its normal position under control of the spring 49. The next time the orifice 39 is blocked, the switch is again switched to its set state and the power stream flows through channel 11 to again actuate the output device.

Figure 6:
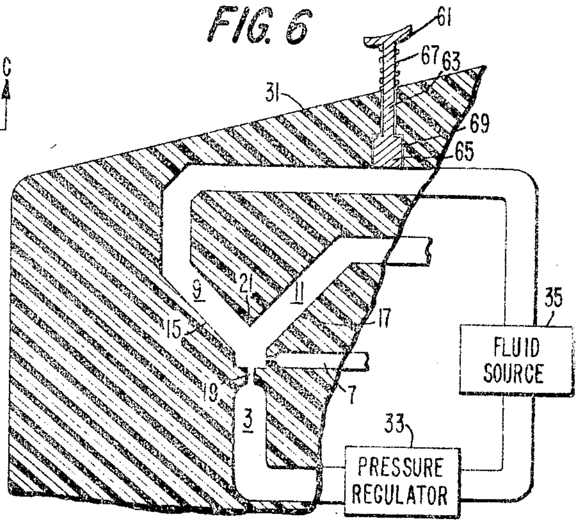
FIGURE 6 is a sectional view of a keyboard showing a third embodiment of the present invention.

FIGURE 6 shows a keyboard 31 and a bistable fluid amplifier comprising a power stream input channel 3, a control signal input channel 7, and first and second output channels 9 and 11. Fluid source 35 and pressure regulator 33 supply a substantially constant stream of fluid to the power stream input channel 3. Walls 15 and 17 are offset from orifice 19 with wall 15 being closer to the orifice than wall 17 thus causing the power stream to initially lock on to wall 15 and flow through channel 9. Channel 9 may be returned to the low pressure side of fluid source 35 thus forming a closed fluid system which may utilize either a gaseous or liquid fluid.

A key 61 is connected by means of a keystem 63 to a body 65. A spring 67 provides the bias to normally hold the key in its upper most position with the body 65 resting within a chamber 69.

The divider 21 and the channel 9 are shaped as described above so that they provide no enhancement of the boundary layer control. As explained subsequently channel 11 may or may not have a configuration whereby the boundary layer along wall 17 is enhanced.

FIGURE 6 operates as follows. The amplifier is initially reset so that fluid flows through channel 9 with the power stream locked on to wall 15. The power stream returns to the fluid source. When key 61 is depressed the body 67 blocks channel 9 resulting in backloading of the amplifier. This causes the power stream to switch so that it locks on to wall 17 and flows through channel 11 to perform the work function. After the work function has been performed the amplifier is reset by applying a reset signal to channel 7. This deflects the power stream back to channel 9 where it again locks on to wall 15.

Figure 7:
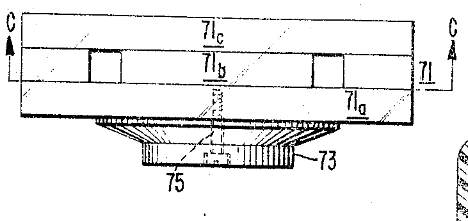
FIGURES 7 and 8 are top and front views of a further embodiment of the present invention.
Figure 8:
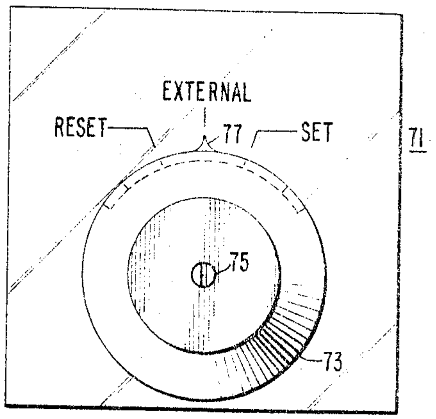
Figure 9:
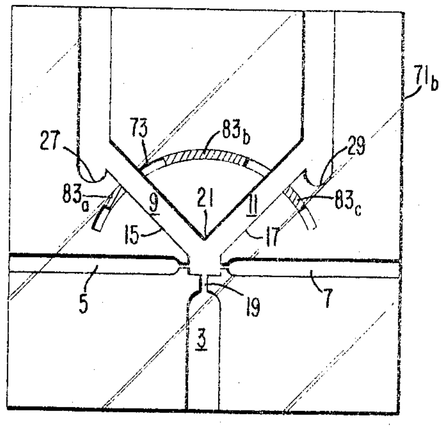

FIGURES 7 and 8 show top and side views of a pure fluid bistable amplifier 71 having a manually rotatable control knob 73. The fluid amplifier comprises three laminated sheets **71*a*, 71*b*, and 71*c*. Sheet 71*c* is substantially flat while sheet 71*b*** contains a configuration of channels as shown in FIGURE 9.

Sheet **71*b* contains a power stream input channel 3, first and second control signal input channels 5 and 7, and first and second output signal channels 9 and 11. Sheet 71*b* also contains a slit or arcuate groove 73 which intersects channels 9 and 11. Sheet 71*a* has a similar arcuate groove which is aligned with groove 73** when the sheets are assembled.

The control knob 73 is rotatably mounted on a shoulder screw 75 which in turn is screwed into the face of sheet **71*a*. The knob may be provided with a pointer 77** to indicate the position of the knob.

Figure 12:
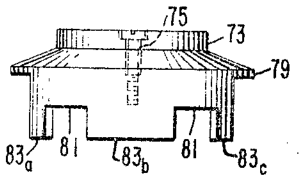
FIGURE 12 shows a control knob suitable for controlling a bistable fluid amplifier.

The knob has an arcuate portion 79 having recesses 81 thus forming a plurality of elements 83 extending along the axis of rotation. See FIGURE 12. The arcuate portion 79 passed through the arcuate groove of sheet **71*a* so that the recessed surfaces 81 lie in the plane between sheets 71*a* and 71*b*. The elements 83 extend through sheets 71*a* and 71*b* so that their lower surfaces as viewed in FIGURE 12 lie in the plane between sheets 71*b* and 71*c*. The arrangement is such that the elements 83 may block the channels 9 and 11 as the knob is rotated. Suitable fluid seals may be provided to prevent leakage of fluid from the system between arcuate portion 79 and the walls of the groove in sheet 71*a***.

FIGURE 9 is a sectional view of the amplifier taken along the line C—C of FIGURE 7 and shows the elements 83 of the control knob in the position permitting external control of the amplifier by fluid pulses applied to the channels 5 and 7.

The amplifier of FIGURE 9 has a reset state manifested by flow of the power stream through channel 9 and a set state manifested by flow of the power stream through channel 11. The dividing element 21 is spaced from orifice 19 so as to prevent enhancement of the boundary layer control. If the use of the amplifier is such as to result in serious backloading either wall 15, 17, or both may have sharp curvature as indicated at 27 and 29 to prevent switching of the amplifier when it is driving a load. If the use of the amplifier is such that extreme backloading will not be encountered then walls 15 and 17 may be made straight as illustrated in FIGURES 2, 4 and 6.

When a fluid stream is applied to input channel 3 and the control knob is in the position shown in FIGURE 9 the power stream initially locks on to wall 15 and flows out through channel 9 because wall 15 is offset from orifice 19 by a smaller distance than wall 17. The amplifier may be switched from this reset state to the set state by applying a fluid signal to channel 5. As explained above this disrupts the boundary layer adjacent wall 15 and deflects the power stream so that it flows through channel 11 and locks on to wall 17.

The amplifier may be reset by applying a fluid pulse to channel 7. This disrupts the boundary layer adjacent wall 17 and deflects the power stream into channel 9 where it locks on to wall 15. Thus, the fluid amplifier of FIGURE 9 functions in the same manner as amplifiers of the prior art provided the knob 73 is positioned so that the elements 83 do not block channels 9 and 11.

The knob may be positioned to have an overriding effect which prevents signals in channels 5 and 7 from switching the amplifier to a particular state.

Figure 10:
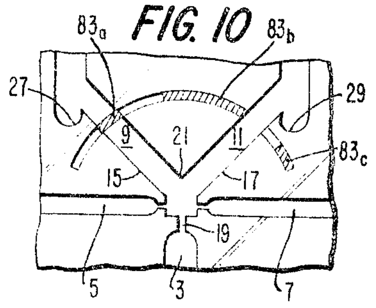
FIGURES 9, 10 and 11 are sectional views taken along the line C—C of FIGURE 7 when the control knob is in the external, set and reset positions, respectively.

Assume for example that the knob is rotated clockwise so that the element 83*a* blocks channel 9. This position is shown in FIGURE 10. If the amplifier is already in its set state the blocking of channel 9 has no effect. If the amplifier is in the reset state the blocking of channel 9 causes the power stream to switch from channel 9 to channel 11 and lock on to wall 17. Note that this switching action takes place even though channel 9 has a curvature 27 which enhances the bistable characteristic of the amplifier. The enhancement by curvature 27 is nullified because element 83*a* is interposed between the curvature 27 and the orifice 19.

With channel 9 blocked by element 83*a* fluid signals applied to channel 7 cannot reset the amplifier. Although a signal applied to channel 7 may disrupt the boundary layer adjacent wall 17 the boundary layer is reestablished and the power stream locks on to wall 17 as soon as the signal on channel 7 is terminated.

If the knob is rotated counterclockwise until the element 83*c* blocks channel 11 (FIG. 11) the amplifier may be made to assume its reset state regardless of the presence of signals on channel 5 which tend to set it. Blockage of channel 11 by element 83*c* nullifies the enhancement characteristic of curvature 29 and backloads channel 11 causing the power stream to lock on to wall 15 and flow out through channel 9. A control signal applied to channel 5 disrupts the boundary layer adjacent wall 15 but this boundary layer is reestablished upon termination of the control signal. Thus blockage of channel 11 by element 83*c* overrides the effect of a signal in channel 5 and insures that the amplifiers remains reset.

The amplifier shown in FIGURE 9 may be set or reset under manual control and still be controllable by fluid control signals applied to channels 5 and 7. As previously explained, if the control knob is in the position shown in FIGURE 9 where the elements 83 do not block either channel 9 or channel 11, a signal in channel 7 resets the amplifier and a signal in channel 5 resets the amplifier.

Assume that the last fluid control signal was a signal on channel 7 which reset the amplifier and it is desired to manually set the amplifier yet have it free to respond to subsequent fluid control signals. The control knob is rotated until element 83*a* blocks channel 9 as shown in FIGURE 10. This sets the amplifier. The knob is then rotated to the position shown in FIGURE 9 where neither channel 9 or 11 is blocked by the elements 83. The amplifier is thus manually set yet is able to respond to subsequent fluid control signals on channels 5 and 7.

Figure 11:
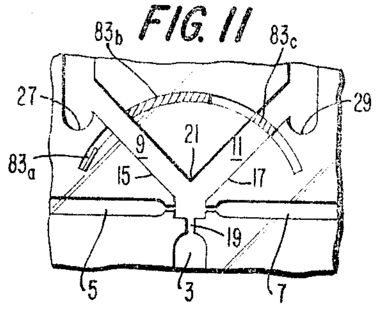

In like manner the amplifier may be manually reset yet left in a condition to respond control signals on channels 9 and 11. This is accomplished by first rotating the control knob until element 83*c* blocks channel 11 as shown in FIGURE 11 and then rotating the knob until the elements 83 block neither channel 9 or channel 11 as shown in FIGURE 9.

If it is desired to have a bistable switch of the type shown in FIGURE 9 with manual controls only, the channels 5 and 7 are not necessary. In some applications it may be desirable to provide either channel 5 or channel 7 but not both.

While preferred embodiments of the invention have been shown and described various modifications of the invention within the scope of the invention will become obvious to those skilled in the art. For example, the channel 11 as shown in FIGURES 2, 4, and 6 may be provided with sharp curvatures 29 as shown in FIGURE 9 to enhance the bistable characteristic if the output device causes backloading of the amplifier to a degree which would normally switch it back to the reset state.

In this regard it should be noted that the blocking element 47 of FIGURE 4 must be arranged such that it blocks channel 11 at some point between orifice 19 and the point at which the sharp curvature is made.

In other modifications the keyboards of FIGURES 4 or 6 may be provided with a single means which simultaneously resets all fluid amplifiers in the keyboard as opposed to the individual reset means shown herein. It is intended therefore to be limited only by the scope of the appended claims.

I claim:

1. A keyboard mechanism comprising:

(a) a keyboard having a key thereon, (b) a bistable pure fluid switch having an input channel, a first channel connected with said input channel and terminating at an opening in said key, and an output channel connected with said input channel, (c) the chamber formed by the intersection of said input channel, said first channel, and said output channel having a configuration whereby a fluid stream flowing through said input channel normally flows through said chamber and said first channel and whereby upon and subsequent to closure of said opening said fluid stream flows through said output channel, (d) and a control signal channel terminating at an orifice in said chamber for deflecting said fluid stream back to said normal path of fluid flow through said first channel.

2. A keyboard mechanism as claimed in claim 1 wherein said control signal channel is connected with said output channel.

3. The combination comprising:

(a) a keyboard having an opening therein, (b) and a bistable pure fluid amplifier having a power stream input channel, a control signal input channel, and first and second output channels, (c) said first output channel terminating at said opening in said keyboard, (d) and said control signal input channel being connected to said second output channel.

4. The combination comprising:

(a) a keyboard having an opening therein, (b) a bistable pure fluid amplifier having a power stream input channel, a reset signal input channel, and first and second output channels, (c) said first output channel terminating at said opening in said keyboard whereby momentary closure of said opening causes permanent deflection of said power stream to said second output channel, (d) means for applying a fluid stream to said power stream input channel, (e) and fluid conducting means for applying reset signals from said second output channel to said reset signal channel to thereby deflect said power stream to said first output channel.

5. The combination comprising:

(a) a keyboard having a plurality of openings therein, (b) a plurality of bistable pure fluid switches within said keyboard, each of said switches having a power stream input channel and first and second output channels, (c) said first output channels each terminating at one of said openings in said keyboard whereby momentary closure of one of said openings causes permanent deflection of the power stream of the corresponding bistable switch to said second output channel, (d) means for applying fluid to each of said power stream input channels, (e) and means for returning power streams deflected to said second output channel to said first output channel.

6. The combination as claimed in claim 5 wherein said means for returning deflected power streams comprises key operated means for blocking said second output channels.

7. The combination comprising:

(a) a bistable fluid switch comprising a body having a power stream input channel and first and second output channels, (b) means for applying a fluid stream to said power stream input channel, (c) a rotatable control member mounted on said body, (d) said control member having an arcuate section extending along the axis of rotation of said member and into said body, (e) said body having an arcuate recess therein for receiving said arcuate section, (f) said recess extending across said first and second output channels and having an arcuate length greater than said section whereby said section may be moved along said recess as said control member is turned, (g) and said arcuate section having recessed portions whereby said first output may be restricted and then opened while said second output channel remains open to thereby set said switch by rotation of said control member.

8. The combination as claimed in claim 7 wherein said recessed portions are located relative to each other whereby said second output channel may be restricted and then opened while said first output channel remains open to thereby reset said switch by rotation of said control member.

9. The combination as claimed in claim 8 and further including first and second control signal channels for setting and resetting said switch when said control member is positioned to open both said first and second output channels.

10. A keyboard device comprising:

(a) a bistable pure fluid amplifier having a set state and a reset state and having a power stream input channel, first and second output channels, and a reset signal channel, (b) means for applying fluid to said power stream input, (c) key operated means for blocking said first output channel to thereby set said amplifier, (d) and means for applying fluid signals to said reset signal channel to reset said amplifier.

11. A keyboard device comprising:

(a) a bistable pure fluid amplifier having a set state and a reset state and having a power stream input channel, first and second output channels, and a reset signal channel, (b) means for applying fluid to said power stream input, (c) a key, said first output channel terminating at an opening in said key whereby said fluid amplifier may be set by closing said opening, (d) and means for applying fluid signals to said reset signal channel to reset said amplifier.

12. A keyboard device comprising:

(a) a bistable fluid amplifier of the type having no enhancement of the boundary layer control, (b) and key means having an orifice therein, (c) said amplifier having a power stream input channel, a first output channel terminating at an orifice in said key, and a second output channel through which fluid signals may pass, (d) said power stream input channel and said first and second output channels being interconnected whereby fluid flowing through said power stream input channel flows into one or the other of said output channels.

13. A selectively operable device comprising:

(a) a bistable pure fluid amplifier having first and second output channels intersecting to form a chamber, and a power stream input channel terminating at an orifice in said chamber, (b) said output channels and said orifice being positioned such that the walls of said chamber formed by a first wall of each of said output channels are offset from said orifice to thereby produce regions of low pressure between said walls and a power stream entering said chamber through said orifice, (c) said chamber having a dividing element formed by the intersection of second walls of said output channels at a point close enough to said orifice to avoid enhancement of said low pressure regions, (d) means for selectively blocking said output channels, (e) and means for applying a fluid stream to said power stream input channel, (f) said amplifier having a recessed portion intersecting said output channels, (g) said blocking means including a manually positionable control element having portions thereof extending into said recessed portion for selectively blocking said first or said second output channel.

14. A selectively operable device as claimed in claim 13 wherein at least one of said output channels has an acute change of slope tending to enhance at least one of said low pressure regions, said recessing portion of said amplifier intersecting said at least one output channel at a point between said acute change of slope and said chamber.

15. A keyboard input device comprising:

(a) a mechanically actuable bistable switch comprising first, second, and third channels interconnected to form a pure fluid bistable switch having a set state wherein fluid flows from said first channel to said third channel and a reset wherein fluid flows from said first channel to said second channel, (b) means for applying a fluid stream to said first channel, (c) inhibiting means for switching said switch from said reset state to said set state by selectively inhibiting the flow of fluid through said second channel, (d) means for resetting said fluid switch by deflecting fluid emerging from said first channel into said second channel, (e) and a keyboard, (f) said inhibiting means comprising a key means normally extending into said keyboard adjacent said second channel and when actuated extending into said second channel to inhibt fluid flow therein.

16. A selectively operable keyboard input device comprising:

(a) a keyboard having therein a bistable pure fluid amplifier having first and second output channels intersecting to form a chamber, and a power stream input channel terminating at an orifice in said chamber, (b) said output channels and said orifice being positioned such that the walls of said chamber formed by a first wall of each of said output channels are offset from said orifice to thereby produce regions of low pressure between said walls and a power stream entering said chamber through said orifice, (c) said chamber having a dividing element formed by the intersection of second walls of said output channels at a point close enough to said orifice to avoid enhancement of said low pressure regions, (d) means for applying a fluid stream to said power stream input channel, (e) said first wall of said second channel being offset from said orifice a greater distance than said first wall of said first channel so that upon the initiation of fluid flow through said orifice said power stream flows into said first output channel, (f) key operated means for selectively blocking said first output channel whereby said power stream is switched to thereby flow into said second output channel, (g) said second output channel but not said first output channel having an acute change of slope, said slope creating a vortex tending to enhance the low pressure region adjacent the first wall of said second output channel when the power stream flows therethrough, (h) and means for switching said power stream to flow into said first output channel.

17. A keyboard mechanism comprising:

(a) a keyboard having a key thereon, (b) a pure fluid switch having an input channel, a first channel connected with said input channel and terminating at an opening in said key, and an output channel connected with said input channel, (c) the chamber formed by the intersection of said input channel, said first channel, and said output channel having a configuration whereby a fluid stream flowing through said input channel normally flows through said chamber and said first channel and whereby upon and subsequent to closure of said opening said fluid stream flows through said output channel;

(d) and a control signal channel terminating at an orifice in said chamber for deflecting said fluid stream back to said normal path of fluid flow through said first channel.

References Cited by the Examiner

UNITED STATES PATENTS

| | | | |
|---|---|---|---|
| 1,959,889 | 5/1934 | Wunsch | 137—81.5 |
| 2,889,856 | 6/1959 | Magnuson | 137—81.5 X |
| 3,005,533 | 10/1961 | Wadey | 197—15 |

ROBERT E. PULFREY, *Primary Examiner.*

ROBERT LEIGHEY, *Examiner.*

ROBERT CUNNINGHAM, A. F. FOURNIER, E. S. BURR, *Assistant Examiners.*